(12) United States Patent
Odagiri et al.

(10) Patent No.: US 8,598,259 B2
(45) Date of Patent: Dec. 3, 2013

(54) VINYL CHLORIDE RESIN COMPOSITION FOR TRANSPARENT PRODUCT, AND TRANSPARENT MOLDED PRODUCT PRODUCED BY MOLDING THE COMPOSITION

(75) Inventors: Keiichi Odagiri, Saitama (JP); Tadashi Sengoku, Saitama (JP); Taro Mitsudera, Saitama (JP)

(73) Assignee: Adeka Corporation, Tokyo (JP)

( * ) Notice: Subject to any disclaimer, the term of this patent is extended or adjusted under 35 U.S.C. 154(b) by 335 days.

(21) Appl. No.: 13/123,249

(22) PCT Filed: Sep. 17, 2009

(86) PCT No.: PCT/JP2009/004675
§ 371 (c)(1),
(2), (4) Date: Apr. 8, 2011

(87) PCT Pub. No.: WO2010/041378
PCT Pub. Date: Apr. 15, 2010

(65) Prior Publication Data
US 2011/0201741 A1    Aug. 18, 2011

(30) Foreign Application Priority Data
Oct. 9, 2008    (JP) .................................. 2008-262478

(51) Int. Cl.
*C08K 5/00*    (2006.01)
*C08F 214/06*    (2006.01)
(52) U.S. Cl.
USPC .......................................... 524/399; 524/567
(58) Field of Classification Search
USPC ........................................................ 524/399
See application file for complete search history.

(56) References Cited

U.S. PATENT DOCUMENTS 4,751,261 A * 6/1988 Miyata et al. .................. 524/181
5,352,723 A * 10/1994 Tanno et al. .................. 524/399

FOREIGN PATENT DOCUMENTS

| JP | 6-100749 A | | 4/1994 |
|---|---|---|---|
| JP | 06100749 A | * | 4/1994 |
| JP | 11-302447 A | | 11/1999 |
| JP | 2004-193138 A | | 7/2004 |
| JP | 2004193138 A | * | 7/2004 |
| JP | 2004-224937 A | | 8/2004 |
| JP | 2006-124502 A | | 5/2006 |
| JP | 2008-56506 A | | 3/2008 |
| WO | WO 2009/122681 A1 | | 10/2009 |

OTHER PUBLICATIONS

Translation of JP06-100749, Apr. 12, 1994.*
Translation of JP2004-193138, Jul. 8, 2004.*
International Search Report of PCT/JP2009/004675 (Nov. 2, 2009).

* cited by examiner

*Primary Examiner* — Hui Chin
(74) *Attorney, Agent, or Firm* — Millen, White, Zelano & Branigan, P.C.

(57) ABSTRACT

The vinyl chloride resin composition for transparent products which does not contain heavy metal stabilizers such as lead, tin and barium, characterized in that (A) 0.001~10 mass parts of at least one kind of organic acid zinc salts and (B) 0.001~10 mass parts of at least one kind of zinc-modified hydrotalcite compounds are contained relative to 100 mass parts of vinyl chloride resin; and the transparent molded products produced by molding the said composition.

9 Claims, No Drawings

VINYL CHLORIDE RESIN COMPOSITION FOR TRANSPARENT PRODUCT, AND TRANSPARENT MOLDED PRODUCT PRODUCED BY MOLDING THE COMPOSITION

TECHNICAL FIELD

The present invention relates to a vinyl chloride resin composition for transparent products, and in further detail relates to a vinyl chloride resin composition for transparent products which do not use heavy metal stabilizers, in particular tin stabilizers.

BACKGROUND ART

Vinyl chloride resin whose hardness can be easily adjusted by adding plasticizers, can be used for various uses. In particular, since hard vinyl chloride resin compositions having no plasticizer, or semi-hard vinyl chloride resin compositions having only a small amount of plasticizer have excellent rigidity, they are widely used for building materials or the like. Therefore, hard vinyl chloride resin compositions having no plasticizer and semi-hard vinyl chloride resin compositions having only a small amount of plasticizer require more advanced performance not only in working at high temperatures and pressures but also in heat stability and weather resistance as molded articles.

In the past, hard transparent molded articles obtained from hard vinyl chloride resin compositions have been used for a wide range of products such as cases, industrial boards, decorative boards, film and sheets which require glass-like transparent products. On the contrary, vinyl chloride resin is generally insufficient in stability against light and heat. Therefore, coloring and deterioration of physical properties occur easily since degradation caused mainly by de-hydrogen halide occurs when heat molding is carried out or when the products are used, which are known as disadvantages. In order to improve these disadvantages, attempts have been conventionally made wherein various stabilizers such as organic acid metallic salt, organic tin compound, organic phosphite compound, epoxy compound, β-diketone compound, antioxidant and ultraviolet absorber are blended to improve the stability of vinyl chloride resin.

Conventionally, heavy metal stabilizers such as lead and cadmium have been used from a superiority of cost performance or the like as the above stabilizer. Recently the interest in environmental problems has been growing, therefore, the toxicity and effects of the heavy metal or the like against the environment have come to problems and there has been a tendency to use barium-zinc composite stabilizers. However, in recent years the effects of barium against the environment have started to cause concern. Therefore, the replacement to further lower-toxic calcium-zinc, magnesium-zinc or calcium-magnesium-zinc composite stabilizers is required.

From such viewpoints, a method for adding organic acid calcium salt, organic acid zinc salt, basic phosphorous acid salt and hydrotalcite compounds (Patent document 1), and a method for adding organic acid alkaline earth metallic salt, organic acid zinc salt, basic zinc phosphate and hydrotalcite compounds (Patent document 2) were proposed. However, even though these compounds are used in combination, the performances of heat resistance or the like were insufficient. In addition, there was no description concerning transparency in these patent documents at all, and there was no suggestion of improvement in transparency at all.

Furthermore, vinyl chloride foaming resin compositions for foaming molded products wherein an inorganic filler, a zinc compound, a zinc-modified hydrotalcite compound and a thermal decomposition type organic foaming agent are added (Patent document 3), and polyvinyl chloride resin compositions for food wrapping wherein a adipic acid ester plasticizer, a calcium salt of organic carboxyl acid and a zinc-modified hydrotalcite compound are blended (Patent document 4) are disclosed. However, since there are no descriptions concerning transparency at all in any of these documents, any knowledge concerning the improvement of transparency can be obtained from these documents.

In addition, tin stabilizers are proposed as a stabilizer which can enhance transparency (Patent documents 5 and 6). However, tin is also not preferable from the viewpoints of effects on the environment and toxicity. Moreover, a lot of tin stabilizers are liquid. Therefore, in cases where these are used, not only lubricating properties of molten resin decrease during mold-working, but also the thermal deformation temperature of molded object (a softening point) drops, which was a problem.

PRIOR ART DOCUMENTS

Patent Documents

Patent document 1: Japanese Unexamined Patent Publication Tokkaihei 9-67489
Patent document 2: Japanese Unexamined Patent Publication Tokkai 2003-160707
Patent document 3: Japanese Unexamined Patent Publication Tokkaihei 3-237140
Patent document 4: Japanese Unexamined Patent Publication Tokkaihei 6-100749
Patent document 5: Japanese Unexamined Patent Publication Tokkaisho 62-4739
Patent document 6: Japanese Unexamined Patent Publication Tokkai 2008-1840

SUMMARY OF THE INVENTION

Problems to be Solved by the Invention

Therefore, the first object of the present invention is to provide a vinyl chloride resin composition for transparent products excellent in workability as well as in transparency, without using heavy metal stabilizers such as lead, tin and barium.

The second object of the present invention is to provide a transparent molded product obtained by molding the vinyl chloride resin composition which has not only high transparency but also excellent physical properties like a softening point or the like.

Means to Solve the Problems

Namely, the present invention is the vinyl chloride resin composition for transparent products, characterized in that (A) 0.001~10 mass parts of at least one kind of organic acid zinc salts and (B) 0.001~10 mass parts of at least one kind of zinc-modified hydrotalcite compounds are contained relative to 100 mass parts of vinyl chloride resin; and a transparent product obtained by molding the said composition.

In the present invention, it is preferable to use the compound represented by the following general formula (1) as the zinc-modified hydrotalcite compound of the above component (B)

$$M_{y1}Zn_{y2}Al_x(OH)_2(CO_3)_{x/2}\cdot mH_2O \quad (1)$$

M in the formula (I) represents magnesium, or magnesium and calcium, x, y1 and y2 are numbers satisfying the conditions represented by the following formulae respectively, m represents 0 or any positive numbers; $0<x\leq 0.5$, $y1+y2=1-x$, $y1\geq y2$, $0.3\leq y1<1$, $0<y2<0.5$.

In the present invention, 0.001~10 mass parts of at least one kind of lubricants may be further included as the component (C). Furthermore, 0~50 mass parts of plasticizer component can be included if necessary, but 10~50 mass parts is preferable and 20~40 mass parts is more preferable. Thus, semi-hard vinyl chloride resin can be prepared by including plasticizers. In addition, it is preferable that organic tin compounds are not included from the viewpoints of toxicity and environmental problems.

Effect of the Invention

According to the present invention, the vinyl chloride resin composition for transparent products having excellent workability as well as high transparency can be provided.

In particular, the vinyl chloride resin composition for transparent products of the present invention is suitable for obtaining hard or semi-hard molded products, having high transparency and excellent physical properties like a softening point or the like.

BEST MODES FOR CARRYING OUT THE INVENTION

Hereafter, the vinyl chloride resin composition for transparent products of the present invention is described in detail. Examples of organic acid constituting an organic acid zinc salt of the component (A) used for the present invention are carboxylic acid, organic phosphoric acid or phenols. Furthermore, the said organic acid zinc salt may be any of acidic salts, basic salts or overbased salts.

Examples of the above carboxylic acid are caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid and similar acid, and also mixtures of naturally-produced acids listed above such as tallow fatty acid, palm oil fatty acid, wood oil fatty acid, soybean oil fatty acid and cotton seed oil fatty acid; benzoic acid, p-tert-butylbenzoic acid, ethylbenzoic acid, isopropylbenzoic acid, toluic acid, xylic acid, salicylic acid, 5-tert-octylsalicylic acid, naphthenic acid and cyclohexanecarboxylic acid or the like.

Examples of the above organic phosphoric acid are mono or dioctylphosphoric acid, mono or didodecylphosphoric acid, mono or dioctadecylphosphoric acid, mono or di-(nonylphenyl)phosphoric acid, phosphonic acid nonylphenyl ester and phosphonic acid stearyl ester or the like.

Examples of the above phenols are phenol, cresol, ethylphenol, cyclohexylphenol, nonylphenol and dodecylphenol or the like.

Regarding the organic acid zinc salts used as the component (A) in the present invention, only one kind of them may be used, or two or more kinds of them may be used together. In any case, it is preferable to use zinc salts of organic carboxylic acid in particular from the viewpoints of heat stability and transparency of the composition of the present invention.

The amount of the above organic acid zinc salts used as the component (A) is 0.001~10 mass parts relative to 100 mass parts of vinyl chloride resin, and 0.01~5 mass parts is preferable. If the said amount is less than 0.001 mass parts, coloring properties and weather resistance are insufficient. If it exceeds 10 mass parts, heat stability deteriorates.

The zinc-modified hydrotalcite compound used as the component (B) in the present invention is a double salt compound having magnesium, zinc and aluminium as a metal composition, or a double salt compound having magnesium, calcium, zinc and aluminium as a metal composition. In the present invention, it is preferable to use a double salt compound having magnesium, zinc and aluminium as a metal composition particularly from the viewpoint of transparency.

These double salt compounds can be obtained by treating hydrotalcite compounds using a zinc compound via the usual methods. These double salt compounds may be zinc-modified hydrotalcite compounds obtained by treating or after treating by a zinc compound when the above hydrotalcite compounds are synthesized. These zinc-modified hydrotalcite compounds are described in, for example, Japanese Unexamined Patent Publication Tokkosho 46-2280, Japanese Unexamined Patent Publication Tokkosho 47-32198, Japanese Unexamined Patent Publication Tokkosho 50-30039, Japanese Unexamined Patent Publication Tokkosho 48-29477 and Japanese Unexamined Patent Publication Tokkosho 51-29129. AS a matter of course, commercial products can be used in the present invention.

In the present invention, from the viewpoints of workability, heat stability and transparency, it is preferable to use compounds represented by the following general formula (1) as the zinc-modified hydrotalcite compounds of the component (B).

$$M_{y1}Zn_{y2}Al_x(OH)_2(CO_3)_{x/2}\cdot H_2O \quad (1)$$

M in the formula (1) represents magnesium, or magnesium and calcium. However, in particular magnesium is preferable from the viewpoint of transparency. x, y1 and y2 respectively are numbers satisfying the conditions represented by the following relational expressions, m represents 0 or an any positive number.

$0<x\leq 0.5$, $y1+y2=1-x$, $y1\geq y2$, $0.3\leq y1<1$, $0<y2<0.5$.

Specific examples of the zinc-modified hydrotalcite compounds are as follows.

$Mg_{0.38}Zn_{0.3}Al_{0.32}(OH)_2(CO_3)_{0.16}\cdot 0.2H_2O$
$Mg_{0.45}Zn_{0.23}Al_{0.32}(OH)_2(CO_3)_{0.16}$
$Mg_{0.48}Zn_{0.18}Al_{0.34}(OH)_2(CO_3)_{0.17}$
$Mg_{0.48}Zn_{0.2}Al_{0.32}(OH)_2(CO_3)_{0.16}$
$Mg_{0.5}Zn_{0.17}Al_{0.33}(OH)_2(CO_3)_{0.165}\cdot 0.45H_2O$
$Mg_{0.5}Zn_{0.18}Al_{0.32}(OH)_2(CO_3)_{0.16}$
$Mg_{0.5}Zn_{0.2}Al_{0.3}(OH)_2(CO_3)_{0.16}$
$Mg_{0.5}Zn_{0.2}Al_{0.3}(OH)_2(CO_3)_{0.15}\cdot 0.52H_2O$
$Mg_{0.5}Zn_{0.25}Al_{0.25}(OH)_2(CO_3)_{0.125}$
$Mg_{0.51}Zn_{0.17}Al_{0.32}(OH)_2(CO_3)_{0.16}$
$Mg_{0.52}Zn_{0.16}Al_{0.32}(OH)_2(CO_3)_{0.16}\cdot 0.5H_2O$
$Mg_{0.55}Zn_{0.15}Al_{0.32}(OH)_2(CO_3)_{0.15}$
$Mg_{0.6}Zn_{0.14}Al_{0.26}(OH)_2(CO_3)_{0.13}$
$Mg_{0.6}Zn_{0.16}Al_{0.24}(OH)_2(CO_3)_{0.12}$
$Mg_{0.6}Zn_{0.2}Al_{0.2}(OH)_2(CO_3)_{0.1}$
$Mg_{0.4}Ca_{0.1}Zn_{0.18}Al_{0.32}(OH)_2(CO_3)_{0.16}$
$Mg_{0.3}Ca_{0.2}Zn_{0.2}Al_{0.3}(OH)_2(CO_3)_{0.15}$
$Mg_{0.5}Zn_{0.17}Al_{0.33}(OH)_2(CO_3)_{0.17}\cdot 0.5H_2O$
$Mg_{0.5}Zn_{0.17}Al_{0.33}(OH)_2(CO_3)_{0.17}\cdot 0.42H_2O$
$Mg_{0.6}M_{0.16}Al_{0.24}(OH)_2(CO_3)_{0.12}\cdot 0.45H_2O$

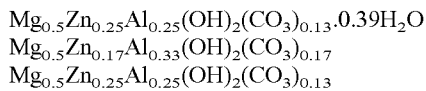

$Mg_{0.5}Zn_{0.25}Al_{0.25}(OH)_2(CO_3)_{0.13} \cdot 0.39H_2O$ $Mg_{0.5}Zn_{0.17}Al_{0.33}(OH)_2(CO_3)_{0.17}$ $Mg_{0.5}Zn_{0.25}Al_{0.25}(OH)_2(CO_3)_{0.13}$ Examples of commercial products are Alkamizer 4 (Alkamizer P-93) and Alkamizer 7 (names of products manufactured by Kyowa Chemical Industry Co., Ltd) or the like. In particular, it is preferable to use the Alkamizer 4 (Alkamizer P-93) from the viewpoint of transparency. In the present invention, only one kind of these zinc-modified hydrotalcite compounds may be used, or two or more kinds of them may be used together.

In the present invention, materials can also be used wherein the surfaces of the above zinc-modified hydrotalcite compounds are coated with higher fatty acids such as stearic acid, higher fatty acid metallic salts such as oleic acid alkali metallic salt, organic sulfonic acid metallic salts such as dodecylbenzenesulfonic acid alkali metallic salts, higher fatty acid amides, higher fatty acid esters, waxes or the like.

The amount of zinc-modified hydrotalcite compound of the component (B) used in the present invention is 0.001~10 mass parts relative to 100 mass parts of polyvinyl chloride resin, however, 0.05~5 mass parts is preferable. If the amount used is less than 0.001 mass parts, the heat stability of the resin composition is insufficient. If it exceeds 10 mass parts, problems occur in coloring resistant properties of the resin composition.

It is preferable that the vinyl chloride resin composition for transparent products of the present invention further contains a lubricant as the component (C) from the viewpoint of workability.

The lubricants used for the present invention can be selected suitably from known lubricants. Examples of the known lubricants are hydrocarbon lubricants such as low molecular weight wax, paraffin wax, polyethylene wax, chlorinated hydrocarbon and fluorocarbon; natural wax lubricants such as carnauba wax and candelilla wax; fatty acid lubricants such as a higher fatty acid like lauric acid, stearic acid and behenic acid, or an hydroxy-fatty acid like hydroxystearic acid; aliphatic amide lubricants such as aliphatic amide compounds like stearylamide, laurylamide and oleylamide, or alkylene bis aliphatic amide like methylenebis(stearylamide) and ethylenebis(stearylamide); fatty acid alcohol ester lubricants such as fatty acid monovalent alcohol ester compounds like stearyl stearate and butyl stearate, or fatty acid polyalcohol ester compounds like glycerol tristearate, sorbitan tristearate, pentaerythritol tetrastearate, dipentaerythritol hexastearate, polyglycerol polyricinolate and cured castor oil, or composite ester compounds of monovalent fatty acids like adipic acid.stearic acid ester of dipentaerythritol, polybasic organic acid and polyalcohol; fatty alcoholic lubricants such as stearyl alcohol, lauryl alcohol and palmityl alcohol; metallic soaps; a montanic acid lubricants such as partially saponified montanic acid ester; acrylic lubricant; and silicone oil. Only one kind of these lubricants may be used or two or more kinds of them may be used together.

In the present invention, it is preferable to use fatty acid alcohol ester lubricants such as composite ester compounds of monovalent fatty acid, polybasic organic acid and polyalcohol, particularly from the viewpoint of transparency. It is preferable that the content of lubricant of the component (C) is 0.01~10 mass parts relative to 100 mass parts of polyvinyl chloride resin in the composition of the present invention. In particular 0.05~5 mass parts is preferable. If the content of lubricant is less than 0.001 mass parts, workability may be insufficient. If it exceeds 10 mass parts, performance decrease such as transparency decrease occurs.

When the vinyl chloride resin composition for transparent products of the present invention is manufactured, the timing of blending the components (A)~(C) with vinyl chloride resin is not limited in particular. For example, two or more kinds selected from the components (A)~(C) may be combined into one pack to blend with vinyl chloride resin. Each component may be blended with vinyl chloride resin. In addition, in cases where combining into one pack is carried out, each component may be mixed after crushing respectively or may be crushed after mixing.

Examples of vinyl chloride resin used for the present invention are vinyl chloride resins such as polyvinyl chloride, chlorinated poly vinyl chloride (CPVC), polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-alkyl-, -cycloalkyl- or -aryl-maleimide copolymer, vinyl chloride-styrene-acrylonitrile terpolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-acrylic acid ester copolymer, vinyl chloride-maleic acid ester copolymer, vinyl chloride-methacrylic acid ester copolymer, vinyl chloride-acrylonitrile copolymer and vinyl chloride-urethane copolymer; and blended products of the above vinyl chloride resins with one kind selected from α-olefin polymers such as polyethylene, polypropylene, polybutene, poly-3-methylbutene, or ethylene-vinyl acetate copolymer, or polyolefins such as ethylene-propylene copolymer and copolymers thereof, or copolymers of polystyrene, acrylic resin and styrene with other monomers (such as maleic anhydride, butadiene and acrylonitrile), or acrylonitrile-butadiene-styrene copolymer, or methacrylic ester-butadiene-styrene copolymer, or polyurethane.

Metallic stabilizers generally used for vinyl chloride resin can be added to the vinyl chloride resin composition for transparent products of the present invention. However, in the present invention, it is not preferable to add lead stabilizers, (organic) tin stabilizers, cadmium stabilizers and barium stabilizers from the viewpoints of effects on the environment and toxicity.

Examples of metallic stabilizers available in the present invention are organic acid metallic salts other than lead, tin, cadmium and barium, and composite stabilizers thereof. These organic acid metallic salts can be optionally used within the range where the effects of the present invention are not negatively affected. However, in cases where these organic acid metallic salts are added, the transparency tends to decrease.

Examples of organic acid metallic salts used as the above metallic stabilizers in the present invention are carboxylic acid, organic phosphoric acid metallic salts or phenol metallic salts (Li, Na, K, Ca, Mg, Sr, Zn, Cs and Al) or the like. Examples of the above carboxylic acid are, for example, caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachidic acid, behenic acid, erucic acid, brassidic acid and similar acids; together with mixtures of the above naturally-produced acids such as tallow fatty acid, coconut oil fatty acid, tung oil fatty acid, soybean fatty acid and cotton seed oil fatty acid; benzoic acid, p-t-butylbenzoic acid, ethylbenzoic acid, isopropylbenzoic acid, toluic acid, xylic acid, salicylic acid, 5-t-octylsalicylic acid, naphtheric acid, cyclohexanecarboxylic acid or the like.

In addition, examples of the above organic phosphoric acids are, for example, mono- or di-octylphosphoric acid, mono- or di-dodecylphosphoric acid, mono- or di-octadecylphosphoric acid, mono- or di-(nonylphenyl) phosphoric acid, phosphonic acid nonylphenyl ester, phosphonic acid stearyl ester or the like.

Furthermore, examples of the above phenol are phenol, cresol, ethylphenol, cyclohexylphenol, nonylphenol and dodecylphenol or the like. These may be normal salt, acid salt, basic salt or overbased complex.

The vinyl chloride resin composition for transparent products of the present invention can provide molded products having excellent physical properties such as high transparency and a high softening point. Therefore, it is preferable to be used for hard resin compositions without adding plasticizers. However, it is possible to be used for semi-hard resin compositions by adding 0~50 mass parts preferably 10~50 mass parts, more preferably 20~40 mass parts of plasticizer relative to 100 mass parts of vinyl chloride resin. In cases where plasticizers are used, the plasticizers usually used for vinyl chloride resin can be suitably used within the range where the effects of the present invention are not negatively affected.

Examples of the above plasticizers are phthalate plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate plasticizers such as dioctyl adipate, diisononyl adipate, diisodecyl adipate and di(butyldiglycol) adipate; phosphate plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester plasticizers using polyalcohols such as ethylene glycol, diethylene glycol, triethylene glycol, 1,2-propylene glycol, 1,3-propylene glycol, 1,3-butanediol, 1,4-butanediol, 1,5-hexanediol, 1,6-hexanediol and neopentyl glycol, and dibasic acids such as oxalic acid, malonic acid, succinic acid, glutaric acid, adipic acid, pimelic acid, suberic acid, azelaic acid, sebacic acid, phthalic acid, isophthalic acid and terephthalic acid, if necessary, using monohydric alcohol and monocarboxylic acid as a stopper; as other examples, tetrahydrophthalic acid plasticizer, azelaic acid plasticizer, sebacic acid plasticizer, stearic acid plasticizer, citric acid plasticizer, trimellitic acid plasticizer, pyromellitic acid plasticizer and biphenylene polycarboxylic acid plasticizer or the like.

In addition, various kinds of additive agents generally used as an additive agent for vinyl chloride resin, for example, an organic phosphite compound, a phenolic antioxidants or sulfur antioxidants, a hydrotalcite compound other than the zinc-modified hydrotalcite compound of the component (B), an epoxy compound, polyols, a β-diketone compound, an ultraviolet absorber, a hindered amine light stabilizer, a filler, a flame retardant and a flame-retardant auxiliary agent or the like can be added to the vinyl chloride resin composition for transparent products of the present invention within the range where the effects of the present invention are not negatively affected.

Examples of the above organic phosphite compound are triphenyl phosphite, tris(2,4-di-tert-butylphenyl)phosphite, tris(nonylphenyl)phosphite, tris(dinonylphenyl)phosphite, tris(mono, di mixed nonylphenyl)phosphite, diphenyl acid phosphite, 2,2'-methylenebis(4,6-di-tert-butylphenyl)octyl phosphite, diphenyldecyl phosphite, phenyl diisodecyl phosphite, tributyl phosphite, tri(2-ethylhexyl) phosphite, tridecyl phosphite, trilauryl phosphite, dibutyl acid phosphite, dilauryl acid phosphite, trilauryl trithio phosphite, bis(neopentyl glycol).1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidene diphenol.pentaerythritol diphosphite, tetra($C_{12}$~$C_{15}$ mixed alkyl)-4,4'-isopropylidene diphenyl diphosphite, hydrogenated-4,4'-isopropylidene diphenol polyphosphite, bis(octylphenyl).bis[4,4'-n-butylidene bis(2-tert-butyl-5-methylphenol)].1,6-hexanediol.diphosphite, tetradecyl.4,4'-butylidene bis(2-tert-butyl-5-methylphenol) diphosphite, hexa(tridecyl).1,1,3-tris(2-methyl-5-tert-butyl-4-hydroxyphenyl)butane.triphosphite, 9,10-dihydro-9-oxa-10-phosphaphenanthrene-10-oxide and 2-butyl-2-ethylpropane diol.2,4,6-tri-tert-butylphenol monophosphite.

Examples of the above phenolic antioxidant are 2,6-di-tert-butyl-p-cresol, 2,6-diphenyl-4-octadecyloxyphenol, stearyl (3,5-di-tert-butyl-4-hydroxyphenyl)-propionate, distearyl(3,5-di-tert-butyl-4-hydroxybenzyl)phosphonate, thiodiethylene glycol bis [(3,5-di-tert-butyl-4-hydroxydiphenyl)-propionate], 1,6-hexamethylenebis[(3,5-di-tert-butyl-4-hydroxyphenyl) propionate], 1,6-hexamethylenebis[(3,5-di-tert-butyl-4-hydroxyphenyl) propionic amide], 4,4'-thiobis (6-tert-butyl-m-cresol), 2,2'-methylenebis(4-methyl-6-tert-butylphenol), 2,2'-methylenebis(4-ethyl-6-tert-butylphenol), bis[3,3-bis(4-hydroxy-3-tert-butylphenyl)butylic acid]glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro [5,5]undecane and triethylene glycol-bis[(3-tert-butyl-4-hydroxy-5-methylphenyl)propionate].

Examples of the above sulfur antioxidant are dialkyl thiodipropionates such as thiodipropionic acid dilauryl, dimyristyl, myristylstearyl or distearyl ester, and β-alkylmercapto propionic acid esters of polyol such as pentaerythritol tetra (β-dodecylmercapto propionate).

The compounds represented by the following formula, for example, can be cited as the hydrotalcite compound other than the zinc-modified hydrotalcite of the component (B).

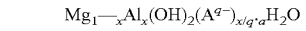

q in the formula is 1 or 2. $A^{q-}$ is an anion having the value q, namely $(CO_3)^{2-}$ or $(ClO_4)^-$, X represents $0<X\leq0.5$, a represents 0 or a positive number.

Representative examples of the hydrotalcite other than the zinc-modified hydrotalcite compound are as follows:

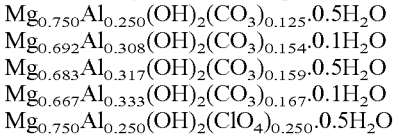

$Mg_{0.692}Al_{0.308}(OH)_2(ClO_4)_{0.308} \cdot 0.1H_2O$ $Mg_{0.667}Al_{0.333}(OH)_2(ClO_4)_{0.333} \cdot 0.1H_2O$ Examples of commercial products are DHT-4A (manufactured by Kyowa Chemical Industry Co., Ltd.), Magceler-1 (manufactured by Kyowa Chemical Industry Co., Ltd.).

Examples of the above epoxy compounds are epoxidized animal and plant oils such as epoxidized soybean oil, epoxidized linseed oil, epoxidized tung oil, epoxidized fish oil, epoxidized beef tallow oil, epoxidized castor oil and epoxidized safflower oil; epoxy compounds such as epoxidized methyl stearate, epoxidized butyl stearate, epoxidized 2-ethylhexyl stearate, epoxidized stearyl stearate, epoxidized polybutadiene, tris(epoxypropyl) isocyanurate, epoxidized tall oil fatty acid ester, epoxidized linseed oil fatty acid ester, bisphenol A diglycidyl ether, vinylcyclohexene diepoxide, dicyclohexene diepoxide, 3,4-epoxycyclohexylmethyl and epoxycyclohexane carboxylate.

Examples of the above polyol compounds are trimethylolpropane, ditrimethylolpropane, pentaerythritol, dipentaerythritol, polypentaerythritol, stearic acid half ester of pentaerythritol or dipentaerythritol, bis(dipentaerythritol) adipate, glycerol and tris(2-hydroxyethyl)isocyanurate.

Examples of the above β-diketone compounds are acetylacetone, triacetylmethane, 2,4,6-heptatrione, butanoyl acetylmethane, lauroyl acetylmethane, palmitoyl acetylmethane, stearoyl acetylmethane, phenylacetyl acetylmethane, dicyclohexylcarbonylmethane, benzoylformylmethane, benzoylacetylmethane, dibenzoylmethane, octylbenzoyl methane, stearoyl benzoyl methane, bis(4-octylbenzoyl) methane, benzoyl diacetyl methane, 4-methoxybenzoyl benzoyl methane, bis(4-carboxymethylbenzoyl) methane, 2-carboxymethyl benzoyl acetyl octyl methane, dehydroacetic acid, cyclohexane-1,3-dione, methyl 3,6-dimethyl-2,4-dioxy cyclohexane-1 carboxylate, 2-acetylcyclohexanone, dimedone, 2-benzoylcyclohexane. Furthermore, the metallic salt of these β-diketone compounds can also be used.

Examples of metal species, which can provide the above β-diketone metallic salt, are alkaline metals such as lithium, sodium and potassium; and magnesium, calcium, strontium, zinc and aluminum.

Examples of the above ultraviolet absorber are 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolyl)phenol and polyethylene glycol ester of 2-(2-hydroxy-3-tert-butyl-5-carboxyphenyl)benzotriazole; benzoates such as phenyl salicylate, resorcinol monobenzoate, 2,4-di-tert-butylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate, methyl-2-cyano-3-methyl-3-(p-methoxyphenyl)acrylate.

Examples of the above hindered amine light stabilizer are hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl) butanetetracarboxylate, tetrakis(1,2,2,6,6-pentamethyl-4-piperidyl)butanetetracarboxylate, bis(1,2,2,6,6-pentamethyl-4-piperidyl).di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidynol/diethyl succinate condensation product, 1,6-bis (2,2,6,6-tetraethyl-4-piperidylamino)hexane/dibromoethane condensation product, 1,6-bis(2,2,6,6-tetramethyl-4-piperidylamino)hexane/2,4-dichloro-6-morpholino-s-triazine condensation product, 1,6-bis(2,2,6,6-tetramethyl-4-piperidylamino)hexane/2,4-dichloro-6-tert-octylamino-s-triazine condensation product, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane and 1,6,11-tris[2,4-bis(N-butyl-N-(1,2,2,6,6-pentamethyl-4-piperidyl)amino)-s-triazine-6-ylamino]undecane.

Specific examples of the above fillers are calcium carbonate, calcium oxide, calcium hydroxide, zinc hydroxide, zinc carbonate, zinc sulfide, magnesium oxide, magnesium hydroxide, magnesium carbonate, aluminium oxide, alminium hydroxide, sodium alminosilicate, hydrotalcite, hydrocalumite; mineral silicates such as aluminium silicate, magnesium silicate, calcium silicate and zeolite; activated clay, talc, clay, red iron oxide, asbestos, antimony trioxide, silica, glass beads, mica, sericite, glass flake, asbestos, wollastonite, potassium titanate, PMF, satin spar, zonolite, MOS, phosphate fiber, glass fiber, carbon fiber and aramid fiber or the like.

Examples of the above flame retardants and flame-retardant auxiliary agents are a triazine ring-containing compound, metallic hydroxide, and also inorganic phosphorus, a halogen flame retardant, a silicone flame retardant, a phosphoric acid ester flame retardant, a condensed phosphoric acid ester flame retardant, an intumescent flame retardant, antimony oxide such as an antimony trioxide, other inorganic flame-retardant auxiliary agents and organic flame-retardant auxiliary agents.

Examples of the above triazine ring-containing compound are melamine, ammeline, benzoguanamine, acetoguanamine, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine and 1,3-hexylenedimelamine or the like.

Examples of the above metal hydroxide are magnesium hydroxide, aluminium hydroxide, calcium hydroxide, barium hydroxide, zinc hydroxide and Kisuma 5A (commercial name of magnesium hydroxide: manufactured by Kyowa Chemical Industry Co., Ltd).

Examples of the above phosphoric acid ester flame retardant are trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyl diphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenylphosphate and tris(isopropylphenyl)phosphate.

Examples of the above condensation phosphoric acid ester flame retardant are 1,3-phenylene bis(diphenylphosphate), 1,3-phenylene bis(dixylenylphosphate) and bisphenol A bis (diphenylphosphate). Examples of the intumescent flame retardant are ammonium salt and amine salt of polyphosphoric acid or the like.

Examples of the above other inorganic flame-retardant auxiliary agent are inorganic compounds such as titanium oxide, aluminum oxide, magnesium oxide and talc, and their surface-treated products. Examples of these inorganic flame-retardant auxiliary agents are various types of commercial products such as TIPAQUE R-680 (commercial name of titanium oxide manufactured by ISHIHARA SANGYO KAISHA, LTD.) and Kyowa MAG 150 (commercial name of magnesium oxide manufactured by Kyowa Chemical Industry Co., Ltd).

The example of the above other organic flame-retardant auxiliary agent is pentaerithritol.

Stabilization auxiliary agents generally used for vinyl chloride resins are added to the vinyl chloride resin composition for transparent products of the present invention within the range where the effects of the present invention are not negatively affected. Examples of such stabilization auxiliary agents are diphenylthiourea, anilinodithiotriazine, melamine, benzoic acid, cinnamic acid, p-tert-butylbenzoic acid, zeolite and perchlorate or the like.

The vinyl chloride resin composition for transparent products of the present invention can further contain additives usually used for the vinyl chloride resin, if necessary, within the range where the effects of the present invention are not negatively affected. The examples of the said additives are crosslinking agents, antistatic agents, tarnish inhibitors, plate-out inhibitors, surface treatment agents, fluorescent agents, mildewcides, disinfectants, foaming agents, metal deactivators, mold lubricants, pigments, processing materials, antioxidants and light stabilizers.

The vinyl chloride resin composition for transparent products of the present invention can be used without relation to the processing method for vinyl chloride resin. For example, it can be preferably used for roll process, extrusion process, meltdown casting method and pressure molding process or the like.

Hereafter, the present invention will be explained further in detail using examples and comparative examples. However, the present invention should not be limited by these examples at all.

Examples 1~7 and Comparative Examples 1~4

After blending each component described in the following [Table 1] and [Table 2] using the Henschel Mixer, the mixture was kneaded for 3 minutes with a roll under the condition of 170° C.×30 rpm×0.6 mm to manufacture a sheet. The obtained sheet was put in the gear oven at 190° C. to measure the blackening time (minute) as "a heat stability test". The results are shown in [Table 1] and [Table 2].

The sheets 0.6 mm thick obtained as mentioned above were glued together and press processing was carried out for 5 minutes at 190° C. to prepare a sheet 1 mm thick and a sheet 2 mm thick. In addition, aside from this, a sheet 1 mm thick was prepared by performing the press processing for 30 minutes at 190° C. Coloring property test and transparency test were carried out using the obtained sheets according to the following methods.

<Coloring Test>

Regarding the aforementioned sheets 1 mm thick which were obtained by performing press processing for 5 minutes and 30 minutes at 190° C., the yellowness level (Y.I.) was measured. The results are shown in [Table 1] and [Table 2].

<Transparency Test>

Regarding the aforementioned sheets 1 mm and 2 mm thick which were obtained by performing press processing for 5 minutes at 190° C., the Haze value was measured. The results are shown in [Table 1] and [Table 2].

TABLE 1

| | | Examples | | | | | | |
|---|---|---|---|---|---|---|---|---|
| | | 1 | 2 | 3 | 4 | 5 | 6 | 7 |
| Vinyl chloride resin *1 | | 100 | 100 | 100 | 100 | 100 | 100 | 100 |
| Phenolic antioxidant *2 | | 0.1 | 0.1 | 0.1 | 0.1 | 0.1 | 0.1 | 0.1 |
| Dibenzoylmethane (DBM) | | 0.5 | 0.5 | 0.5 | 0.5 | 0.5 | 0.5 | 0.5 |
| Component(A) Organic acid zinc salt *3 | | 0.3 | 0.3 | 0.25 | 0.45 | 0.3 | 0.3 | 0.3 |
| Component(B) Zinc-modified hydrotalcite compound *4 | | 1.73 | — | 1.73 | 1.73 | 1.3 | 2.7 | 1.73 |
| Component(B) Zinc-modified hydrotalcite compound *5 | | — | 1.73 | — | — | — | — | — |
| Component(C) Lubricant *6 | | 0.5 | 0.5 | 0.5 | 0.5 | 0.5 | 0.5 | 0.5 |
| Calcium stearate | | — | — | — | — | — | — | 0.1 |
| Heat stability (blackening time: minute) | | 75 | 90 | 120 | 75 | 60 | 120< | 105 |
| Coloring properties | 5 minutes | 18.8 | 17.1 | 19 | 18.3 | 16.8 | 18 | 19.4 |
| | 30 minutes | 49.9 | 52.8 | 52.7 | 42.3 | 39.9 | 93.1 | 50.1 |
| Transparency | 1 mm | 5.47 | 8.4 | 4.99 | 8.9 | 5.56 | 5.31 | 6.54 |
| Haze value (%) | 2 mm | 10.3 | 15.9 | 9.87 | 17.5 | 10.5 | 10.1 | 12.1 |

TABLE 2

| | | Comparative Examples | | | |
|---|---|---|---|---|---|
| | | 1 | 2 | 3 | 4 |
| Vinyl chloride resin *1 | | 100 | 100 | 10 | 100 |
| Phenolic antioxidant *2 | | 0.1 | 0.1 | 0.1 | 0.1 |
| Dibenzoylmethane | | 0.5 | 0.5 | 0.5 | 0.5 |
| Component(A) Organic acid zinc salt *3 | | 0.3 | 0.3 | 0.3 | 0.3 |
| Component(B) Zinc-modified hydrotalcite compound *5 | | — | — | — | — |
| Component(C) Lubricant *6 | | 0.5 | 0.5 | 0.5 | 0.5 |
| Calcium stearate | | — | 0.1 | — | — |
| Magceler-1 *7 | | — | — | 1.73 | — |
| DHT-4A *8 | | — | — | — | 1.73 |
| Heat stability (Blackening time; minute) | | 15 | 15 | 60 | 105 |
| Coloring properties (Y.I) | 5 minutes | Blackening | Blackening | 19.8 | 21.4 |
| | 30 minutes | Blackening | Blackening | 45.8 | 69.9 |

TABLE 2-continued

|  |  | Comparative Examples | | | |
|---|---|---|---|---|---|
|  |  | 1 | 2 | 3 | 4 |
| Transparency | 1 mm | — | — | 14.3 | 18.6 |
| Haze value (%) | 2 mm | — | — | 25.8 | 26.2 |

[1] ZEST 1000Z (Commercial name manufactured by Shin Dai-Ichi Vinyl Corporation)
[2] Tetrakis [methylene-3-(3',5'-di-tert-butyl-4'hydroxyphenyl) propionate] methane
[3] Zinc laurate
[4] Composition formula $Mg_{3.0}ZnAl_2(OH)_{12}(CO_3) \cdot 3H_2O$ (According to the expression of Claim 2, $Mg_{3/6}Zn_{1/6}Al_{2/6}(OH)_2(CO_3)_{1/6} \cdot 0.5H_2O$
[5] Composition formula $Mg_{3.5}Zn_{0.5}Al_2(OH)_{12}(CO_3) \cdot 3H_2O$ (According to the expression of Claim 2, $Mg_{3.5/6}Zn_{0.5/6}Al_{2/6}(OH)_2(CO_3)_{1/6} \cdot 0.5H_2O$
[6] G-72 Polymer complex ester (manufactured by Cognis Oleo Chemicals Japan Ltd.)
[7] Hydrotalcite (manufactured by Kyowa Chemical Industry Co., Ltd.) $Mg_{4.2}Al_2(OH)_{13}(CO_3) \cdot 3H_2O$
[8] Hydrotalcite (manufactured by Kyowa Chemical Industry Co., Ltd.) $Mg_{4.5}Al_2 (CH)_{13}(CO_3) \cdot 3.5H_2O$ From the results of [Table 1] and [Table 2], it was proved that the vinyl chloride resin composition for transparent products of the present invention has not only excellent transparency, but also excellent coloring resistance when heated for a short time.

Examples 8~14

In the same way as the above examples 1~7, after blending each component described in the following [Table 3] using the Henschel Mixer, the mixture was kneaded with a roll under the condition of 170° C.×30 rpm×0.6 mm for 3 minutes to prepare a sheet.

The obtained sheets were put in the gear oven at 190° C. to measure the blackening time (minute) as the "heat stability test". The results are shown in [Table 3].

The sheets 0.6 mm thick obtained as mentioned above were glued together and press processing was carried out for 5 minutes at 190° C. to prepare a sheet 1 mm thick and a sheet 2 mm thick. In addition, aside from this, a sheet 1 mm thick was prepared by performing the press processing for 30 minutes at 190° C.

The coloring property test and the transparency test were carried out using the obtained sheets according to the following methods.

<Coloring Test>

Regarding the aforementioned sheets 1 mm thick which were obtained by performing press processing for 5 minutes and 30 minutes at 190° C., the yellowness level (Y.I.) was measured. The results are shown in [Table 3].

<Transparency Test>

Regarding the aforementioned sheets 1 mm and 2 mm thick which were obtained by performing press processing for 5 minutes at 190° C., the Haze value was measured. The results are shown in [Table 3].

TABLE 3

|  |  | Examples | | | | | | |
|---|---|---|---|---|---|---|---|---|
|  |  | 8 | 9 | 10 | 11 | 12 | 13 | 14 |
| Vinyl chloride resin [1] |  | 100 | 100 | 100 | 100 | 100 | 100 | 100 |
| Phenolic antioxidant [2] |  | 0.1 | 0.1 | 0.1 | 0.1 | 0.1 | 0.1 | 0.1 |
| Dibenzoylmethane (DBM) |  | 0.5 | 0.5 | 0.5 | 0.5 | 0.5 | 0.5 | 0.5 |
| Component(A) |  | 0.3 | 0.25 | 0.45 | 0.3 | 0.3 | 0.3 | 0.3 |
| Organic acid zinc salt [3] |  |  |  |  |  |  |  |  |
| Component(B) Zinc-modified hydrotalcite compound [5] |  | 2.7 | 2.7 | 2.7 | 2.7 | 2.7 | 2.7 | 2.7 |
| Component(C) Lubricant [9] |  | — | 0.5 | — | — | — | — | — |
| Component(C) Lubricant [10] |  | — | — | 0.5 | — | — | — | — |
| Component(C) Lubricant [11] |  | — | — | — | 0.5 | — | — | — |
| Component(C) Lubricant [12] |  | — | — | — | — | 0.5 | — | — |
| Component(C) Lubricant [6] |  | — | — | — | — | — | 0.5 | 0.5 |
| Plasticizer component Dioctylphthalate |  | — | — | — | — | — | — | 30 |
| Heat stability (Blackening time: minutes) |  | 90 | 105 | 90 | 120 | 120< | 120< | 120< |
| Coloring properties | 5 minutes | 18.1 | 18 | 17.9 | 21 | 20.9 | 18 | 14.1 |
|  | 30 minutes | 105.7 | 97.2 | 97 | 94.1 | 98.3 | 93.1 | 89 |
| Transparency | 1 mm | 5.74 | 6.5 | 6.5 | 8.58 | 6.79 | 5.31 | 2.8 |
| Haze value (%) | 2 mm | 11.5 | 13.2 | 13.5 | 17.2 | 13.8 | 10.1 | 5.7 |

(Composition is based on mass parts)
[9] G-32 fatty acid ester (manufactured by Cognis Oleo Chemicals Japan Ltd.)
[10] G60 dibasic acid ester (manufactured by Cognis Oleo Chemicals Japan Ltd.)
[11] G 70s polymer complex ester type (manufactured by Cognis Oleo Chemicals Japan Ltd.)
[12] GH-4 polyol ester (manufactured by Cognis Oleo Chemicals Japan Ltd.)

From the results of [Table 3], it was confirmed that the heat stability can be improved by blending lubricants without affecting the initial coloring resistance and transparency.

INDUSTRIAL APPLICABILITY

The vinyl chloride composition for transparent products of the present invention is suitably used for hard or semi-hard transparent molded products in particular. It can be used for containers requiring glass-like transparency, industrial boards, decorative boards, trays, film, shrink film, sheets, building materials, pipes for water supply and drainage, plates, joints, materials for automobile, hoses, IC cases and bottles or the like.

What is claimed is:

1. A vinyl chloride resin composition capable of producing transparent products, comprising (A) 0.001-10 parts by mass of at least one organic acid zinc salt, (B) 0.001-10 parts by mass of at least one zinc-modified hydrotalcite compound, and (C) 0.001-10 parts by mass of at least one lubricant, relative to 100 parts by mass of vinyl chloride resin, wherein the above composition does not contain an organic tin compound or magnesium oxide.

2. The vinyl chloride resin composition of claim 1, wherein the zinc-modified hydrotalcite compound of the above component (B) is represented by the following general formula (1)

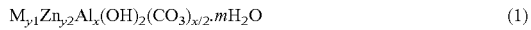    (1)

M in the formula (I) represents magnesium, or magnesium and calcium, x, y1 and y2 are numbers satisfying the conditions represented by the following formulae respectively, m represents 0 or any positive numbers;

$0 < x \leq 0.5, y1+y2=1-x, y1 \geq y2, 0.3 \leq y1 < 1, 0 < y2 < 0.5.$

3. The vinyl chloride resin composition of claim 1, wherein the composition further comprises 0-50 parts by mass of a plasticizer component.

4. The vinyl chloride resin composition of claim 3, wherein the content of the above plasticizer is 10-50 parts by mass.

5. A transparent molded product produced by molding the vinyl chloride resin composition in claim 1.

6. The vinyl chloride resin of claim 1, wherein the lubricant (C) is a fatty acid alcohol ester.

7. The vinyl chloride resin of claim 1, wherein the fatty acid alcohol ester is a composite ester of a monovalent fatty acid, a polybasic organic acid and a polyalcohol.

8. A vinyl chloride resin composition capable of producing transparent products, consisting of (A) 0.001-10 parts by mass of at least one organic acid zinc salt, (B) 0.001-10 parts by mass of at least one zinc-modified hydrotalcite compound, (C) 0.001-10 parts by mass of at least one lubricant, and (D) 0-50 parts by mass of a plasticizer component, relative to 100 parts by mass of vinyl chloride resin, and optionally a phenolic antioxidant and/or a β-diketone compound.

9. A vinyl chloride resin composition capable of producing transparent products, comprising (A) 0.001-10 parts by mass of at least one organic acid zinc salt (B) 0.001-10 parts by mass of at least one zinc-modified hydrotalcite compound, and (c) 0.001-10 parts by mass of at least one fatty acid alcohol ester lubricant that is a composite ester of a monovalent fatty acid, a polybasic organic acid and a polyalcohol, relative to 100 parts by mass of vinyl chloride resin, wherein the above composition does not contain an organic tin compound.

* * * * *